Jan. 13, 1959     T. E. LITTLE     2,867,937
FISH HOLDING IMPLEMENT
Filed April 18, 1957
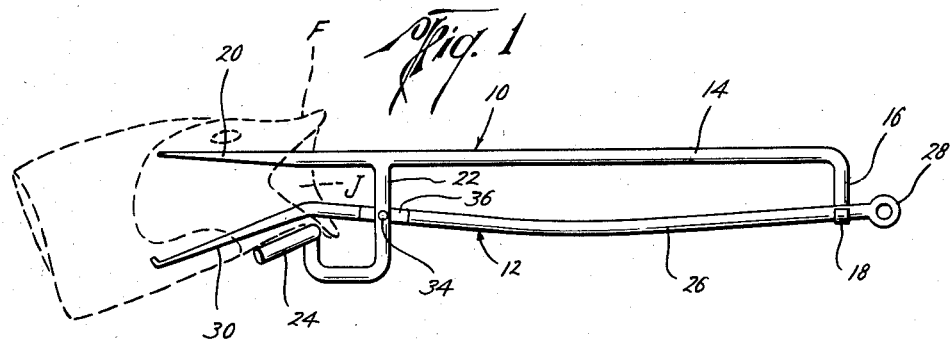
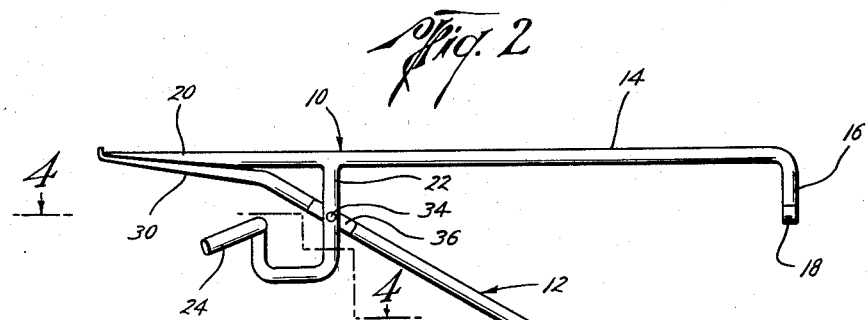
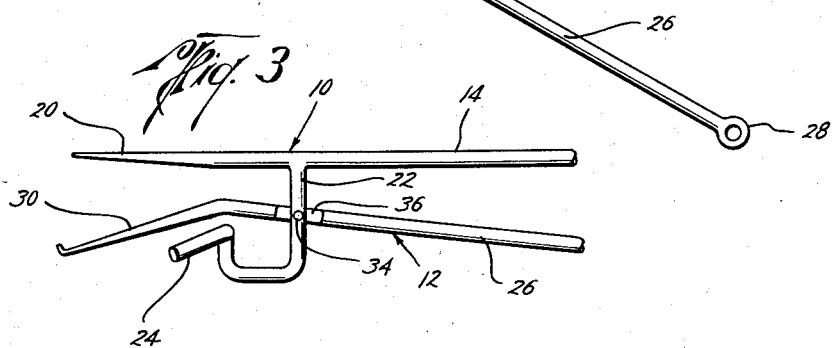
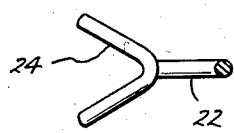
Thomas E. Little
INVENTOR.
BY Charles E. Lightfoot
ATTORNEY

2,867,937
FISH HOLDING IMPLEMENT

Thomas E. Little, Houston, Tex.

Application April 18, 1957, Serial No. 653,574

2 Claims. (Cl. 43—53.5)

This invention relates to a fish holding device and more particularly to a device for use by fishermen for holding a fish with its mouth in an open position to permit the safe removal of a fish hook from the fish.

In fishing with a hook and line the hook often becomes securely embedded in the fish when the fish is caught and the removal of the hook then presents an inconvenient and sometimes dangerous task. Certain kinds of fish are extremely difficult to hold in a suitable position for easy removal of the hook and in the case of large fish there is danger of being bitten in attempting the removing operation.

The present invention has for an important object by the provision of a fish holding device which operates to hold the fish while also securely holding the fish's mouth in a widely open condition whereby a hook may be safely and easily removed from the fish.

Another object of the invention is to provide a fish holding device which may be inserted into the mouth of a fish to pry the same open and hold the fish's mouth in a widely opened position and which also securely grips the fish to prevent the fish from slipping off of the device while the hook is being removed.

A further object of the invention is the provision of a fish holding device of tong-like character having jaws which may be inserted in a fish's mouth and operated to hold the fish's mouth in open condition and embodying means positioned for engagement with the fish exteriorly of the fish's mouth and cooperable with the jaws to grippingly engage the fish to hold the fish against slipping off of the device.

Another object of the invention is to provide fish holding tongs having jaw-engaging portions which may be inserted in a fish's mouth and which are expansible therein to open the fish's mouth, and including a portion located externally of the fish's mouth in position to cooperate with one of said jaw-engaging portions to grippingly engage the fish's jaw when said jaw-engaging portions are expanded.

A still further object of the invention is the provision of fish holding tongs of the character referred to which are of simple design and rugged construction and embodying means for releasably latching the parts in fish holding position.

The above and other important objects and advantages of the invention may best be understood from the following detailed description, constituting a specification of the same, when considered in conjunction with the annexed drawings wherein—

Figure 1 is a side elevational view illustrating a preferred embodiment of the invention and showing the same in fish holding position;

Figure 2 is a view similar to that of Figure 1 showing the invention with jaws in retracted or releasing position preliminary to the insertion of the jaws in a fish's mouth;

Figure 3 is a fragmentary view similar to the view of Figure 1 showing the invention with the jaws in partially expanded condition; and Figure 4 is a cross-sectional view taken along the line 4—4 of Figure 2, looking in the direction indicated by the arrows.

Referring now to the drawings in greater detail, the invention comprises a tong-like device made up of two elongated members 10 and 12 formed of suitable material, such as stainless steel or the like and which may be of circular or other desired cross-sectional shape.

The member 10 has a handle portion 14 which is bent at its outer end to form a laterally extending portion 16 provided with a hook 18 for a purpose to be hereinafter set forth. The member 10 also has an end portion 20 which is flattened or otherwise shaped to form a jaw, and mediate its ends this member has a laterally extending branch portion 22 of generally J-shape provided at its outer end with a V-shaped head 24 which lies in a plane which diverges somewhat from the plane of the jaw 20 toward the free end of said jaw.

The member 12 has a handle portion 26 which may be formed at its outer end with an eye 28, or the like, to which a cord or chain may be attached to prevent loss of the device, and this member also has an end portion 30 which is flattened or otherwise shaped to form a jaw positioned opposite the jaw 20 and which diverges slightly from the jaw 20 toward its outer end when the jaws are in expanded position, as seen in Figure 1.

The members 10 and 12 are pivotally secured together mediate their ends, as by means of a pivot pin 34, which extends through an opening in the long arm of the J-shaped portion 22 and through an opening in flattened portion 36 of the member 12. By this arrangement the members form a tong-like structure with the jaw 30 of the member 12 disposed between the jaw 20 and the V-shaped head 24 of the member 10 and with the handle 26 of the member 12 positioned to be received in the hook 18 when the jaws are in expanded position, as shown in Figure 1, whereby the device is releasably latched in fish holding condition.

In making use of the invention constructed and arranged as described, the device is held with the jaws 20 and 30 in retracted or unexpanded position as shown in Figure 2, the handles 14 and 26 being spread apart. With the jaws thus in retracted position the jaws are inserted in the mouth of the fish, indicated at F in Figure 1, with the lower jaw J of the fish extending between the V-shaped head 24 and the jaw 30. The handles 14 and 26 are then moved toward each other to expand the jaws 20 and 30 to the position indicated in Figure 1, to engage the jaws with the inside of the fish's mouth to hold the same in a widely opened position and the handle 26 is hooked into the hook 18 to latch the parts in holding position. In the expanded position of the tongs as shown in Figure 1 it will be seen that the lower jaw J of the fish is securely clamped between the V-shaped head and the jaw 30 whereby the fish is securely held against slipping off of the tongs during the hook removing operation. With the tongs latched in holding position the fisherman need not hold onto the fish and has both hands free to remove the fish hook from the fish's mouth.

To release the fish, the handle 26 is released from the hook 18, whereupon the handles may be spread apart to retract the jaws to permit removal of the jaws from the mouth of the fish.

It will thus be seen that the invention provides fish holding tongs which are strong in construction and easily operated to securely hold a fish with its mouth in a widely opened condition to permit the safe removal of a hook from the fish's mouth.

While the invention has been disclosed herein in connection with a certain specific embodiment of the same, it will be understood that this is intended by way of illustration only, and that various changes can be made in the construction and arrangement of the parts within the spirit of the invention and the scope of the appended claims.

Having thus clearly shown and described the invention, what is claimed as new and desired to secure by Letters Patent is:

1. An implement for holding a fish with its mouth open comprising two elongated members each having a jaw at one end and a handle portion at the other end, one of said members having a branch portion mediate its ends, means forming a pivotal connection between the other of said members mediate its ends and said branch portion with the jaws of the members positioned to be moved toward each other for insertion in the mouth of a fish upon movement apart of said handle portions and to be moved apart into engagement with the mouth of the fish to hold the mouth open upon movement of the handle portions toward each other, and means on said branch portion positioned for coaction with one of said jaws to clampingly engage the mouth of the fish.

2. An implement for holding a fish with its mouth open comprising two elongated members each having a jaw at one end and a handle portion at the other end, one of said members having a branch portion of substantially J-shape mediate its ends, means pivotally connecting the other of the members mediate its ends to said branch portion with the jaws positioned to be moved toward each other for insertion in the mouth of a fish upon movement apart of the handle portions and to be moved apart into engagement with the interior of the mouth of the fish to hold the mouth open upon movement of the handle portions toward each other, and means carried by said branch portion in position for engagement with the exterior of the mouth of the fish and to coact with one of said jaws to clampingly engage the mouth of the fish when said jaws are moved apart.

References Cited in the file of this patent
UNITED STATES PATENTS

| | | |
|---|---|---|
| 2,481,007 | Dugdale | Sept. 6, 1949 |
| 2,644,267 | Helgeson | July 7, 1953 |
| 2,747,321 | Thompson | May 29, 1956 |